United States Patent
Nagao

(10) Patent No.: US 11,557,762 B2
(45) Date of Patent: Jan. 17, 2023

(54) LITHIUM COMPOSITE METAL OXIDE, POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

(71) Applicant: SUMITOMO CHEMICAL COMPANY, LIMITED, Tokyo (JP)

(72) Inventor: Daisuke Nagao, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 17/415,369

(22) PCT Filed: Oct. 11, 2019

(86) PCT No.: PCT/JP2019/040186
§ 371 (c)(1),
(2) Date: Jun. 17, 2021

(87) PCT Pub. No.: WO2020/129374
PCT Pub. Date: Jun. 25, 2020

(65) Prior Publication Data
US 2022/0059831 A1  Feb. 24, 2022

(30) Foreign Application Priority Data
Dec. 20, 2018 (JP) .............................. JP2018-238843

(51) Int. Cl.
| C01G 51/00 | (2006.01) |
| C01G 53/00 | (2006.01) |
| H01M 4/505 | (2010.01) |
| H01M 4/525 | (2010.01) |
| H01M 10/0525 | (2010.01) |
| H01M 4/02 | (2006.01) |

(52) U.S. Cl.
CPC ............ *H01M 4/505* (2013.01); *C01G 53/50* (2013.01); *H01M 4/525* (2013.01); *H01M 10/0525* (2013.01); *C01P 2002/50* (2013.01); *C01P 2002/72* (2013.01); *C01P 2004/51* (2013.01); *C01P 2004/61* (2013.01); *C01P 2004/62* (2013.01); *C01P 2006/40* (2013.01); *H01M 2004/028* (2013.01)

(58) Field of Classification Search
CPC ..................... C01G 51/42–64; C01G 53/42–64
See application file for complete search history.

(56) References Cited

U.S. PATENT DOCUMENTS

| 2007/0264573 A1 | 11/2007 | Yamada et al. |
| 2010/0209771 A1 | 8/2010 | Shizuka et al. |
| 2011/0305939 A1 | 12/2011 | Imanari et al. |
| 2013/0260248 A1 | 10/2013 | Seki et al. |
| 2013/0323606 A1 | 12/2013 | Yoshida et al. |
| 2015/0380737 A1 | 12/2015 | Kawasato et al. |
| 2016/0013472 A1* | 1/2016 | Mitsumoto ............ C01G 53/50 429/231.1 |
| 2017/0125808 A1* | 5/2017 | Blangero ............... H01M 4/525 |
| 2018/0026268 A1* | 1/2018 | Kim ........................ C01G 53/42 429/223 |
| 2019/0330072 A1 | 10/2019 | Imanari et al. |
| 2021/0043917 A1 | 2/2021 | Kurita et al. |

FOREIGN PATENT DOCUMENTS

| CN | 101585560 A | 11/2009 |
| EP | 3 054 508 A1 | 8/2016 |
| EP | 3 225 592 A1 | 10/2017 |
| JP | 2007-103141 A | 4/2007 |
| JP | 2009-081130 A | 4/2009 |
| JP | 2012-518871 A | 8/2012 |
| JP | 2013-206552 A | 10/2013 |
| JP | 2016-026981 A | 2/2016 |
| JP | 2018-014326 A | 1/2018 |
| JP | 2018-098218 A | 6/2018 |
| WO | 2010/094394 A1 | 8/2010 |
| WO | 2010/098187 A1 | 9/2010 |
| WO | 2011/071904 A2 | 6/2011 |
| WO | 2012/124240 A1 | 9/2012 |
| WO | 2018/110256 A1 | 6/2018 |

OTHER PUBLICATIONS

International Search Report issued in corresponding International Patent Application No. PCT/JP2019/040186, dated Jan. 7, 2020, with English translation.

Japanese Notice of Reasons for Refusal issued in corresponding Japanese Patent Application No. 2018-238843, dated May 14, 2019, with English translation.

Extended European Search Report issued in corresponding European Patent Application No. 19899519.3-1108, dated Aug. 16, 2022.

Chinese Office Action issued in corresponding Chinese Patent Application No. 201980083563.2, dated Sep. 30, 2022, with English translation.

\* cited by examiner

*Primary Examiner* — Hoa (Holly) Le

(74) *Attorney, Agent, or Firm* — McDermott Will & Emery LLP

(57) ABSTRACT

The present invention relates to a lithium composite metal oxide which satisfies the requirements (1) and (2) described below. Requirement (1): The ratio of the half width A of the diffraction peak within the range of $2\theta=64.5\pm1°$ to the half width B of the diffraction peak within the range of $2\theta=44.4\pm1°$, namely A/B is from 1.39 to 1.75 (inclusive) in powder X-ray diffractometry using a Cu—Kα ray. Requirement (2): The ratio of the volume-based 90% cumulative particle size ($D_{90}$) to the volume-based 10% cumulative particle size ($D_{10}$), namely $D_{90}/D_{10}$ is 3 or more.

12 Claims, 1 Drawing Sheet

LITHIUM COMPOSITE METAL OXIDE, POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

CROSS REFERENCE TO RELATED APPLICATIONS

This application is the U.S. National Phase under 35 U.S.C. § 371 of International Application No. PCT/JP2019/040186, filed on Oct. 11, 2019, which claims the benefit of Japanese Application No. 2018-238843, filed on Dec. 20, 2018, the entire contents of each are hereby incorporated by reference.

TECHNICAL FIELD

The present invention relates to a lithium composite metal oxide, a positive electrode active material for a lithium secondary battery, a positive electrode for a lithium secondary battery, and a lithium secondary battery.

DESCRIPTION OF RELATED ART

Lithium composite metal oxides are used as positive electrode active materials for lithium secondary batteries. Lithium secondary batteries have already been put to practical use not only as compact power supplies for portable telephones, notebook computers and the like, but also as medium- or large-sized power supplies for automobile use, electric power storage use, etc.

Various investigations have been carried out to improve the battery characteristics of lithium secondary batteries such as cycle performance. For example, Patent Document 1 describes an active material in which the ratio of the half width of the (003) plane with respect to the half width of the (104) plane in the powder X-ray diffraction pattern is 0.57 or less.

PRIOR ART REFERENCES

Patent Document

Patent Document 1: Japanese Unexamined Patent Application Publication No. 2013-206552

SUMMARY OF THE INVENTION

Problems to be Solved by the Invention

As the application field of lithium secondary batteries advances, the positive electrode active material for lithium secondary batteries is required to further improve the cycle performance.

The present invention has been made in view of the above-mentioned circumstances, and the object of the present invention is to provide a lithium composite metal oxide having high cycle performance when used as a positive electrode active material for a lithium secondary battery, a positive electrode active material for a lithium secondary battery, a positive electrode for a lithium secondary battery, and a lithium secondary battery.

Means to Solve the Problems

In other words, embodiments of the present invention include the following inventions [1] to [10].

[1] A lithium composite metal oxide which satisfies requirements (1) and (2):

(1) a ratio (A/B) of a half width A of a diffraction peak in a range of $2\theta=64.5\pm1°$ with respect to a half width B of a diffraction peak in a range of $2\theta=44.4\pm1°$ in a powder X-ray diffraction measurement for the lithium composite metal oxide using Cu-K$\alpha$ ray is 1.39 or more and 1.75 or less;

(2) a ratio $(D_{90}/D_{10})$ of a volume-based 90% cumulative particle size $(D_{90})$ determined from a particle size distribution measurement with respect to a volume-based 10% cumulative particle size $(D_{10})$ determined from the particle size distribution measurement is 3 or more.

[2] The lithium composite metal oxide according to [1], which satisfies requirement (1)-1: the half width A is 0.200° or more and 0.350° or less.

[3] The lithium composite metal oxide according to [1] or [2], which satisfies requirement (3): a ratio $I_2/I_1$ of an integral intensity $I_2$ of a diffraction peak in a range of $2\theta=18.5\pm1°$ with respect to an integral intensity $I_1$ of a diffraction peak in a range of $2\theta=64.5\pm1°$ in a powder X-ray diffraction measurement for the lithium composite metal oxide using Cu-K$\alpha$ ray is 4.0 or more and 6.0 or less.

[4] The lithium composite metal oxide according to any one of [1] to [3], which satisfies composition formula (I):

$$Li[Li_x(Ni_{(1-y-z-w)}Co_yMn_zM_w)_{1-x}]O_2 \qquad (I),$$ 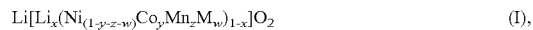

wherein relations $-0.1 \leq x \leq 0.2$, $0 \leq y \leq 0.4$, $0 \leq z \leq 0.4$, $0 \leq w \leq 0.1$, and $y+z+w<1$ are satisfied, and M is one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

[5] The lithium composite metal oxide according to [4], wherein x in the composition formula (I) is $0<x\leq0.2$.

[6] The lithium composite metal oxide according to [4] or [5], wherein y+z+w in the composition formula (I) is $0<y+z+w\leq0.3$.

[7] The lithium composite metal oxide according to any one of [1] to [6], wherein a volume-based 50% cumulative particle size $(D_{50})$ determined from the particle size distribution measurement is 500 nm or more and 9 μm or less.

[8] A positive electrode active material for a lithium secondary battery, comprising the lithium composite metal oxide according to any one of [1] to [7].

[9] A positive electrode for a lithium secondary battery, comprising the positive electrode active material for a lithium secondary battery according to [8].

[10] A lithium secondary battery, comprising the positive electrode for a lithium secondary battery according to [9].

Effect of the Invention

According to the present invention, it is possible to provide a lithium composite metal oxide having high cycle performance when used as a positive electrode active material for a lithium secondary battery, a positive electrode active material for a lithium secondary battery, a positive electrode for a lithium secondary battery, and a lithium secondary battery.

DESCRIPTION OF THE EMBODIMENTS

<Lithium Composite Metal Oxide>

Figure 1A:
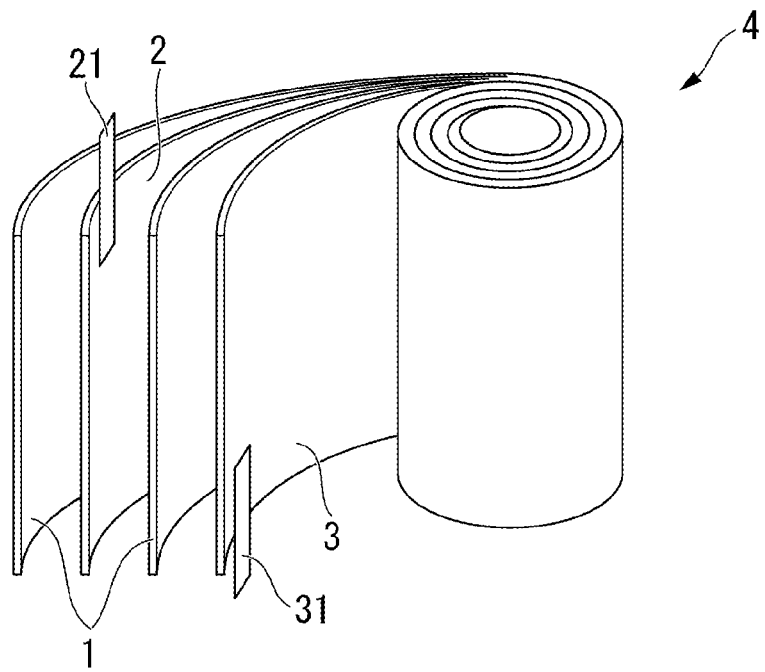
FIG. 1A is a schematic view showing one example of a lithium ion secondary battery.

The lithium composite metal oxide according to the present embodiment satisfies requirements (1) and (2).

(1) A ratio (A/B) of a half width A of a diffraction peak in a range of $2\theta=64.5\pm1°$ with respect to a half width B of a diffraction peak in a range of $2\theta=44.4\pm1°$ in a powder X-ray diffraction measurement for the lithium composite metal oxide using Cu-Kα ray is 1.39 or more and 1.75 or less;

(2) A ratio ($D_{90}/D_{10}$) of a volume-based 90% cumulative particle size ($D_{90}$) determined from a particle size distribution measurement with respect to a volume-based 10% cumulative particle size ($D_{10}$) determined from the particle size distribution measurement is 3 or more.

When the lithium composite metal oxide according to the present embodiment is used, it is possible to produce a positive electrode for a lithium battery having high cycle performance.

Here, the "cycle performance" refers to the maintenance rate of the discharge capacity after repeating the discharge cycle with respect to the initial discharge capacity.

<<Requirement (1)>>

The lithium composite metal oxide according to the present embodiment satisfies the requirement (1).

(1) A ratio (A/B) of a half width A of a diffraction peak in a range of $2\theta=64.5\pm1°$ with respect to a half width B of a diffraction peak in a range of $2\theta=44.4\pm1°$ in a powder X-ray diffraction measurement for the lithium composite metal oxide using Cu-Kα ray is 1.39 or more and 1.75 or less.

The powder X-ray diffraction analysis can be carried out using an X-ray diffractometer (for example, UltimaIV, manufactured by Rigaku Corporation). Detailed analysis conditions will be described in Examples. The half width A and the half width B can be obtained by analyzing the obtained powder X-ray pattern with analysis software (for example, integrated powder X-ray analysis software JADE).

In the case where the lithium composite metal oxide belongs to the space group R-3m, the peak existing in the range of diffraction angle $2\theta=64.5\pm1°$ is the peak corresponding to the (110) plane of the unit cell, which is the smallest unit in the crystal structure.

In the case where the lithium composite metal oxide belongs to the space group R-3m, the peak existing in the range of diffraction angle $2\theta=44.4\pm1°$ is the peak corresponding to the (104) plane of the unit cell, which is the smallest unit in the crystal structure.

The lower limit of the ratio (A/B) is preferably 1.47, more preferably 1.50, particularly preferably 1.53. The upper limit of the ratio (A/B) is preferably 1.70, more preferably 1.65, and particularly preferably 1.60. The above-described upper limit values and lower limit values can be arbitrarily combined. Examples of combinations include 1.47 or more and 1.70 or less, 1.50 or more and 1.65 or less, and 1.53 or more and 1.60 or less.

The lithium composite metal oxide satisfying the requirement (1) is a lithium composite metal oxide having highly isotropic crystallites. In the case of highly isotropic crystallites, the expansion and contraction of the crystallites that occur when lithium is desorbed during charging and when lithium is inserted during discharge can be relaxed between the crystallites. In the case of highly anisotropic crystallites (that is, poorly isotropic crystallites), the expansion and contraction of the crystallites that occur when lithium is desorbed during charging and when lithium is inserted during discharge cannot be relaxed between the crystallites, which causes cracks between the crystallites during charging and discharging. It is presumed that the lithium metal oxide satisfying the requirement (1) can achieve high cycle performance because there are few cracks between crystallites that can be the starting point of deterioration during charging and discharging, and the stability during charging and discharging is excellent.

<<Requirement (1)-1>>

It is preferable that the lithium composite metal oxide according to the present embodiment further satisfies the requirement (1)-1.

(1)-1 The half width A of the diffraction peak in a range of $2\theta=64.5\pm1°$ in a powder X-ray diffraction measurement for the lithium composite metal oxide using Cu-Kα ray is 0.200° or more and 0.350° or less.

The half width A is more preferably 0.210° or more and particularly preferably 0.220° or more. The half width A is more preferably 0.340° or less and particularly preferably 0.330° or less. The above-described upper limit values and lower limit values can be arbitrarily combined. Examples of combinations include 0.210° or more and 0.340° or less and 0.220° or more and 0.330° or less. When the half width A is within the above range, it is presumed that high cycle performance can be achieved since the stability of the crystal structure is excellent during charging.

The half width B of the diffraction peak in the range of $2\theta=44.4\pm1°$ in a powder X-ray diffraction measurement for the lithium composite metal oxide using Cu-Kc ray is preferably 0.170° or more, more preferably 0.180° or more, even more preferably 0.185 or more. The half width B is preferably 0.214° or less, more preferably 0.210° or less, and even more preferably 0.206° or less. The above-described upper limit values and lower limit values can be arbitrarily combined. Examples of combinations include 0.170° or more and 0.214° or less, 0.180° or more and 0.210° or less, and 0.185° or more and 0.206° or less. When the half width B is within the above range, it is presumed that high cycle performance can be achieved since the stability of the crystal structure is excellent during charging.

<<Requirement (2)>>

The lithium composite metal oxide according to the present embodiment satisfies the requirement (2).

(2) A ratio ($D_{90}/D_{10}$) of a volume-based 90% cumulative particle size ($D_{90}$) determined from a particle size distribution measurement with respect to a volume based 10% cumulative particle size ($D_{10}$) determined from the particle size distribution measurement is 3 or more.

In the present embodiment, the $D_{90}/D_{10}$ is preferably 8 or more, more preferably 10 or more, and particularly preferably 12 or more. The upper limit of $D_{90}/D_{10}$ is not particularly limited, and examples thereof include 40 or less, 30 or less, and 20 or less.

The upper limit values and the lower limit values of $D_{90}/D_{10}$ can be arbitrarily combined. Examples of combinations include 3 or more and 40 or less, 8 or more and 40 or less, 10 or more and 30 or less, and 12 or more and 20 or less.

The volume-based cumulative particle size is measured by the laser diffraction scattering method.

First, 0.1 g of a lithium composite metal oxide is added to 50 ml of 0.2 wt % aqueous solution of sodium hexametaphosphate, thereby obtaining a dispersion with the powder of the lithium composite metal oxide dispersed therein.

Next, the obtained dispersion is subjected to a particle size distribution measurement using a laser scattering particle size distribution measuring apparatus (for example, Microtrack MT3300EXII, manufactured by Microtrack Bell Co., Ltd.), whereby the volume-based cumulative particle size distribution curve is obtained.

From the obtained cumulative particle size distribution curve, the value of the particle size at the point where the cumulative volume from the smallest particle side is 10% is the volume-based 10% cumulative particle size ($D_{10}$) (μm), and the value of the particle size at the point where the cumulative volume from the smallest particle side is 90% is the volume-based 90% cumulative particle size ($D_{90}$) (μm), when the whole of the cumulative volume is 100%. Further, the value of the particle size at the point where the cumulative volume from the smallest particle side is 50% is the volume-based 50% cumulative particle size ($D_{50}$) (μm).

The lithium composite metal oxide satisfying the requirement (2) is a powder having a wide particle size distribution. In the case where the particle size distribution is wide, the electrode density can be increased when producing the positive electrode. Specifically, coarse particles enter into the large voids formed between the particles, and fine particles enter into the small space. As a result, the electrode density can be improved, so that the charge/discharge capacity per mass of the lithium composite metal oxide is improved.

The $D_{10}$ of the lithium composite metal oxide according to the present embodiment is not particularly limited as long as $D_{90}/D_{10}$ satisfies the above range, but is preferably 0.1 μm or more and 5.0 μm or less, more preferably 0.5 μm or more and 4.0 μm or less, and even more preferably 1.0 μm or more and 3.5 μm or less.

The $D_{90}$ of the lithium composite metal oxide according to the present embodiment is not particularly limited as long as $D_{90}/D_{10}$ satisfies the above range, but is preferably 7.0 μm or more and 40 μm or less, more preferably 9.0 μm or more and 37 μm or less, and even more preferably 11.0 μm or more and 35 μm or less.

In the lithium composite metal oxide according to the present embodiment, the $D_{50}$ determined from the particle size distribution measurement is preferably 500 nm and more and 9 μm or less, more preferably 1 μm or more and 8 μm or less, and particularly preferably 3 μm or more and 7 μm or less.

When the lithium composite metal oxide of the present embodiment satisfying the requirement (1) which has highly isotropic crystallites is used, deterioration during charging and discharging starting from cracks between crystallites can be suppressed when charging and discharging a lithium battery. On the other hand, even in the case of a lithium composite metal oxide having a high degree of regularity in a series of unit lattices, if there are many voids between the particles due to agglutination of the particles or the like, cracks between the particles are likely to occur during charging and discharging. In the present embodiment, since the positive electrode having a high electrode density can be produced by further satisfying the requirement (2), high cycle performance can be obtained.

It is preferable that the lithium composite metal oxide according to the present embodiment further satisfies the requirement (3).

(3) A ratio $I_2/I_1$ of an integral intensity $I_2$ of a diffraction peak in a range of $2\theta=18.5\pm1°$ with respect to an integral intensity $I_1$ of a diffraction peak in a range of $2\theta=64.5\pm1°$ in a powder X-ray diffraction measurement for the lithium composite metal oxide using Cu-Kα ray is 4.0 or more and 6.0 or less.

The powder X-ray diffraction analysis can be carried out using an X-ray diffractometer (for example, UltimaIV, manufactured by Rigaku Corporation). Detailed analysis conditions will be described in Examples. The integral intensity $I_1$ and the integral intensity $I_2$ can be obtained by analyzing the obtained powder X-ray pattern with analysis software (for example, integrated powder X-ray analysis software JADE).

In the case where the lithium composite metal oxide belongs to the space group R-3m, the peak existing in the range of diffraction angle $2\theta=18.5\pm1°$ is the peak corresponding to the (003) plane of the unit cell, which is the smallest unit in the crystal structure.

The ratio $I_2/I_1$ is more preferably 4.3 or more, particularly preferably 4.5 or more. Further, the ratio $I_2/I_1$ is more preferably 5.5 or less, particularly preferably 5.0 or less. The above-described upper limit values and lower limit values can be arbitrarily combined. Examples of combinations include 4.3 or more and 5.5 or less and 4.5 or more and 5.0 or less.

When the ratio $I_2/I_1$ is within the above range, the presence ratio of the (110) plane on which lithium is desorbed and inserted is high, and lithium can be efficiently desorbed and inserted, resulting in the positive electrode active material for a lithium secondary battery having excellent cycle performance.

<<Composition Formula (I)>>

The lithium composite metal oxide according to the present embodiment is preferably represented by the following composition formula (I).

$$Li[Li_x(Ni_{(1-y-z-w)}Co_yMn_zM_w)_{1-x}]O_2 \quad (I)$$

Here, relations $-0.1 \leq x \leq 0.2$, $0 \leq y \leq 0.4$, $0 \leq z \leq 0.4$, $0 \leq w \leq 0.1$, and $y+z+w<1$ are satisfied, and M is one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

For obtaining a lithium secondary battery with higher cycle performance, x in the composition formula (I) is preferably more than 0, more preferably 0.01 or more, and even more preferably 0.02 or more. For obtaining a lithium secondary battery with higher initial coulombic efficiency, x in the composition formula (I) is preferably 0.1 or less, more preferably 0.08 or less, and even more preferably 0.06 or less.

The upper limit values and lower limit values of x can be arbitrarily combined.

In the present embodiment, $0<x\leq0.2$ is preferable and $0<x\leq0.1$ is more preferable.

For obtaining a lithium secondary battery with higher discharge capacity, in the composition formula (I), $0<y+z+w\leq0.5$ is preferable, $0<y+z+w\leq0.3$ is more preferable, $0<y+z+w\leq0.25$ is even more preferable, and $0<y+z+w\leq0.2$ is particularly preferable.

For obtaining a lithium secondary battery having low internal resistance, y in the composition formula (I) is preferably 0.005 or more, more preferably 0.01 or more, and even more preferably 0.05 or more. For obtaining a lithium secondary battery with high thermal stability, y in the composition formula (I) is preferably 0.35 or less, and more preferably 0.33 or less.

The upper limit values and lower limit values of y can be arbitrarily combined.

In the present embodiment, $0<y\leq 0.4$ is preferable, $0.005\leq y\leq 0.35$ is more preferable, $0.01\leq y\leq 0.35$ is even more preferable, and $0.05\leq y\leq 0.33$ is particularly preferable.

For obtaining a lithium secondary battery with higher cycle performance, z in the composition formula (I) is preferably 0.01 or more, more preferably 0.02 or more, and even more preferably 0.1 or more. For obtaining a lithium secondary battery with higher storage stability under high temperature conditions (e.g., at 60° C.), z in the composition formula (I) is preferably 0.39 or less, more preferably 0.38 or less, and even more preferably 0.35 or less.

The upper limit values and lower limit values of z can be arbitrarily combined.

For example, z is preferably 0.01 or more and 0.39 or less, more preferably 0.02 or more and 0.38 or less, and even more preferably 0.1 or more and 0.35 or less.

For obtaining a lithium secondary battery having low internal resistance, w in the composition formula (I) is preferably more than 0, more preferably 0.0005 or more, and even more preferably 0.001 or more. For obtaining a lithium secondary battery with higher discharge capacity at high current rate, w in the composition formula (I) is preferably 0.09 or less, more preferably 0.08 or less, and even more preferably 0.07 or less.

The upper limit values and lower limit values of w can be arbitrarily combined.

For example, w is preferably more than 0 and 0.09 or less, more preferably 0.0005 or more and 0.08 or less, and even more preferably 0.001 or more and 0.07 or less.

Further, M in the composition formula (I) is preferably at least one element selected from the group consisting of Mg, Ca, Zr, Al, Ti, Zn, Sr, W, and B for obtaining a lithium secondary battery with higher cycle performance, and is preferably at least one element selected from the group consisting of Al, W, B and Zr for obtaining a lithium secondary battery with higher thermal stability.

In the present embodiment, w, x, y, and z in the composition formula (1) can be obtained by analyzing with an inductively coupled plasma emission spectrometer (for example, SPS3000, manufactured by SII Nano Technology Inc.) after the lithium composite metal oxide is dissolve in hydrochloric acid.

(Layered Structure)

In the present embodiment, the crystal structure of the lithium composite metal oxide is a layered structure, and more preferably a hexagonal crystal structure or a monoclinic crystal structure.

The hexagonal crystal structure belongs to any one of the space groups selected from the group consisting of P3, $P3_1$, $P3_2$, R3, P-3, R-3, P312, P321, $P3_1 12$, $P3_1 21$, $P3_2 12$, $P3_2 21$, R32, P3 m1, P31m, P3c1, P31c, R3m, R3c, P-31m, P-31c, P-3 m1, P-3c1, R-3m, R-3c, P6, $P6_1$, $P6_5$, $P6_2$, $P6_4$, $P6_3$, P-6, P6/m, $P6_3$/m, P622, $P6_1 22$, $P6_5 22$, $P6_2 22$, $P6_4 22$, $P6_3 22$, P6 mm, P6cc, $P6_3$cm, $P6_3$mc, P-6m2, P-6c2, P-62m, P-62c, P6/mmm, P6/mcc, $P6_3$/mcm, and $P6_3$/mmc.

The monoclinic crystal structure belongs to any one of the space groups selected from the group consisting of P2, $P2_1$, C2, Pm, Pc, Cm, Cc, P2/m, $P2_1$/m, C2/m, P2/c, $P2_1$/c, and C2/c.

Among the aforementioned crystal structures, from the viewpoint of obtaining a lithium secondary battery having high discharge capacity, the particularly preferable crystal structure of the lithium composite metal oxide is a hexagonal crystal structure belonging to R-3m or a monoclinic crystal structure belonging to C2/m.

<Positive Electrode Active Material for Lithium Secondary Battery>

The positive electrode active material for a lithium secondary battery according to the present embodiment includes the lithium metal composite oxide according to the present invention. The content ratio of the lithium metal composite oxide with respect to the total mass (100% by mass) of the positive electrode active material for the lithium secondary battery is typically 70% by mass or more and 99% by mass or less, and may be 80% by mass or more and 98% by mass or less.

<Method for Producing Lithium Composite Metal Oxide>

The method for producing the lithium composite metal oxide according to the present embodiment will be described.

The method for producing the lithium composite metal oxide according to the present embodiment is preferably a production method containing the following step (1), step (2), and step (3) in this order.

Step (1): a step for producing a precursor powder of the positive electrode active material for a lithium secondary battery.

Step (2): a mixing step of mixing the precursor powder and a lithium compound to obtain mixture.

Step (3): a step of calcining the mixture to obtain a lithium composite metal oxide.

[Step for Producing Precursor Powder of Positive Electrode Active Material for Lithium Secondary Battery]

First, a nickel-containing composite metal compound is prepared, which includes essential metals other than lithium, i.e., nickel which is an essential metal, and optional metal such as cobalt and manganese. As the nickel-containing composite metal compound which is the precursor, a nickel-containing composite metal hydroxide or a nickel-containing composite metal oxide can be used.

The precursor can be produced by the conventionally known batch co-precipitation method or continuous co-precipitation method. Hereinbelow, the production method is explained taking as an example the case of production of a nickel-containing composite metal hydroxide containing nickel, cobalt, and manganese (hereinafter sometimes referred to as "composite metal hydroxide").

A nickel salt solution, a cobalt salt solution, a manganese salt solution and a complexing agent are reacted by the continuous co-precipitation method described in Japanese Patent Unexamined Publication No. 2002-201028 to produce a composite metal hydroxide represented by $Ni_{(1-y-z)}Co_y Mn_z(OH)_2$ (wherein $0\leq y\leq 0.4$ and $0\leq z\leq 0.4$).

There is no particular limitation with respect to a nickel salt as a solute in the aforementioned nickel salt solution. For example, any one of nickel sulfate, nickel nitrate, nickel chloride and nickel acetate can be used.

As a cobalt salt as a solute in the cobalt salt solution, for example, any one of cobalt sulfate, cobalt nitrate, cobalt chloride and cobalt acetate can be used.

As a manganese salt as a solute in the manganese salt solution, for example, any one of manganese sulfate, manganese nitrate, manganese chloride and manganese acetate can be used.

These metal salts are used in a ratio corresponding to the composition ratio of the aforementioned $Ni_{(1-y-z)}Co_y Mn_z(OH)_2$. That is, the amount of each metal salt is set such that the molar ratio of nickel, cobalt, and manganese in the mixed solution containing the above metal salts matches (1-y-z-w):y:z in the composition formula (I) for the lithium metal composite oxide.

The complexing agent is a substance capable of forming a complex with ions of nickel, cobalt and manganese in an aqueous solution, the examples of which include an ammonium ion donor (ammonium salts such as ammonium hydroxide, ammonium sulfate, ammonium chloride, ammonium carbonate, and ammonium fluoride), hydrazine, ethylenediaminetetraacetic acid, nitrilotriacetic acid, uracil diacetate and glycine. The complexing agent may be omitted, and when the complexing agent is used, the amount of the complexing agent contained in a mixture containing the nickel salt solution, the cobalt salt solution, the manganese salt solution, and the complexing agent is, for example, more than 0 and 2.0 or less, in terms of a molar ratio thereof relative to the total number of moles of the metal salts.

For adjusting the pH value of the aqueous solution during the precipitation, if necessary, an alkali metal aqueous solution (such as sodium hydroxide or potassium hydroxide) may be added.

Successive addition of the aforementioned nickel salt solution, cobalt salt solution and manganese salt solution as well as the complexing agent to a reaction vessel allows nickel, cobalt and manganese to react with each other, resulting in the generation of nickel cobalt manganese composite hydroxide. The reaction is performed with the temperature in the reaction vessel being regulated, for example, within the range of 20° C. to 80° C., preferably 30° C. to 70° C.

The pH value at 40° C. in the reaction vessel is regulated, for example, preferably within the range of pH 9 or more and pH 13 or less, preferably within the range of pH 11 or more and pH 13 or less. By controlling the pH in the reaction vessel to the above range, the metal composite compound having a sufficiently developed layered structure and a regular crystal structure can be produced.

The materials in the reaction vessel are appropriately stirred. The reaction vessel is one which allows the overflow for separation of the precipitated reaction product. As the reaction vessel, a type of reaction vessel which allows the overflow for separation of the precipitated reaction product can be used.

The inside of the reaction vessel may be in an inert atmosphere. The inert atmosphere suppresses the aggregation of elements that are more easily oxidized than nickel, and a uniform composite metal hydroxide can be obtained.

Further, the inside of the reaction vessel may be in an appropriate oxygen-containing atmosphere or in the presence of an oxidizing agent while maintaining an inert atmosphere. This is because the morphology of the composite metal hydroxide can be easily controlled by appropriately oxidizing the transition metal. The oxygen and oxidant in the oxygen-containing gas need only have sufficient oxygen atoms to oxidize the transition metal. If a large amount of oxygen atoms are not introduced, the inert atmosphere in the reaction vessel can be maintained. When controlling the atmosphere in the reaction vessel with a gas type, a predetermined gas type may be aerated in the reaction vessel or bubbling directly with the reaction solution.

After the above reaction, the obtained reaction precipitate is washed and then dried to isolate a nickel-containing composite metal hydroxide as a nickel-containing composite metal compound.

For the isolation, a method of dehydrating a slurry containing a reaction precipitate (coprecipitate slurry) by centrifugation, suction filtration, or the like is preferably used.

The coprecipitate obtained by the dehydration is preferably washed with water or a washing solution containing alkali. In the present embodiment, it is preferable to wash with a washing solution containing alkali, and more preferably to wash with a sodium hydroxide solution.

A nickel-containing composite metal hydroxide can be obtained by drying the reaction precipitate after washing. A nickel-containing composite metal oxide may be obtained by performing heat treatment after drying. When preparing a nickel-containing composite metal oxide from a nickel-containing composite metal hydroxide, an oxidation step may be carried out in which the nickel-containing composite metal hydroxide is calcined at a temperature of 300° C. or higher and 800° C. or lower for 1 hour or more and 10 hours or lower.

Pulverization Step of Pulverizing Precursor Powder

In the present embodiment, the production method includes a pulverization step of pulverizing the produced precursor. By pulverizing the precursor, a lithium composite metal oxide which satisfies the above requirements (1) and (2) can be produced.

The pulverization step is preferably carried out using an air flow type pulverizer, a collision type pulverizer with a classification mechanism, a pin mill, a ball mill, a jet mill, a counter jet mill, or the like. Among them, when pulverized by a jet mill or a counter jet mill, agglomeration between primary particles can be pulverized.

Taking the pulverization step by a jet mill as an example, the lower limit of the pulverization pressure is preferably 0.2 MPa, more preferably 0.25 MPa, and particularly preferably 0.3 MPa. The upper limit of the pulverization pressure is preferably 0.7 MPa, more preferably 0.65 MPa, and particularly preferably 0.6 MPa.

The above-described upper limit values and lower limit values can be arbitrarily combined.

Examples of combinations include 0.2 MPa or more and 0.7 MPa or less, 0.25 MPa or more and 0.65 MPa or less, and 0.3 MPa or more and 0.6 MPa or less.

Taking the pulverization step by a counter jet mill as an example, the lower limit of the pulverization pressure is preferably 0.2 MPa, more preferably 0.3 MPa, and particularly preferably 0.4 MPa. The upper limit of the pulverization pressure is preferably 0.8 MPa, more preferably 0.7 MPa, and particularly preferably 0.6 MPa.

The above-described upper limit values and lower limit values can be arbitrarily combined.

Examples of combinations include 0.2 MPa or more and 0.8 MPa or less, 0.3 MPa or more and 0.7 MPa or less, and 0.4 MPa or more and 0.6 MPa or less.

When the pulverization pressure is not more than the above upper limit value, the lithium composite metal oxide satisfying the requirements (1) and (2) can be produced while suppressing the destruction of the crystal structure. When the pulverization pressure is at least the above lower limit value, it is possible to prevent the residual of unpulverized coarse particles and produce the lithium composite metal oxide satisfying the requirements (1) and (2).

Before and after the pulverization step, powder X-ray diffraction measurement for the precursor using Cu-Kα ray is performed, and the ratio ($\alpha/\beta$) of the integral intensity $\alpha$ of the peak existing in the range of diffraction angle $2\theta=19.2\pm1°$ with respect to the integral intensity $\beta$ of the peak existing in the range of diffraction angle $2\theta=33.5\pm1°$ respectively.

In the present embodiment, the ratio ($\alpha/\beta$) before the pulverization step is defined as A1, and the ratio ($\alpha/\beta$) after the pulverization step is defined as B1. In the present embodiment, the ratio (B1/A1) of B1 to A1 is preferably more than 1 and 2 or less, more preferably 1.2 or more and 1.8 or less, and particularly preferably 1.4 or more and 1.7 or less.

[Mixing Step]

This step is a step of mixing a lithium compound and the precursor to obtain a mixture.

Lithium Compound

In the present invention, as the lithium compound, any one of or a mixture of two or more of lithium carbonate, lithium nitrate, lithium acetate, lithium hydroxide, lithium oxide, lithium chloride, and lithium fluoride can be used. Among these, either one or both of lithium hydroxide and lithium carbonate is preferable.

Further, when the lithium compound contains lithium carbonate, the amount of lithium carbonate with respect to the total mass of the lithium compound is preferably 5% by mass or less.

A method of mixing the precursor and the lithium compound will be described.

The precursor is dried and then mixed with the lithium compound. The drying conditions are not particularly limited, and examples thereof include any of the following drying conditions 1) to 3).

1) Conditions under which the precursor is not oxidized nor reduced. Specifically, it is a drying condition where an oxide remains to be an oxide and a hydroxide remains to be a hydroxide each other.

2) Condition under which the precursor is oxidized. Specifically, it is a drying condition where a hydroxide is oxidized into an oxide.

3) Condition under which the precursor is reduced. Specifically, it is a drying condition where an oxide is reduced into a hydroxide.

For providing conditions which do not cause oxidation nor reduction, drying may be carried out using an inert gas such as nitrogen, helium, and argon. For providing conditions which oxidize the hydroxide which is the precursor, drying may be carried out using oxygen or air.

Further, for providing conditions which reduce the precursor, drying may be carried out using a reducing agent such as hydrazine and sodium sulfite in an inert gas atmosphere.

After drying the precursor, the resulting may be subjected to appropriate classification.

The aforementioned lithium compound and the precursor are mixed in respective amounts determined in view of the composition ratio of the end product. For example, the lithium compound and the precursor are mixed such that the ratio of the number of lithium atoms with respect to the number of metal atoms contained in the composite metal oxide or composite metal hydroxide is more than 1.0. The ratio of the number of lithium atoms with respect to the number of metal atoms is preferably 1.05 or more, more preferably 1.10 or more. The lithium composite metal oxide is obtained by calcining a mixture of the nickel-containing composite metal hydroxide and the lithium compound in a subsequent calcination step.

[Step of Calcining Mixture to Obtain Lithium Composite Metal Oxide]

In the present embodiment, the mixture of the lithium compound and the precursor is calcined in the presence of an inert melting agent.

Calcination of the mixture in the presence of an inert melting agent can facilitate the crystallization reaction of the mixture. The inert melting agent may remain in the lithium composite metal oxide after calcination, or it may be removed by washing the mixture with washing solution after calcination. In the present embodiment, it is preferable to wash the lithium composite metal oxide after calcination with pure water, an alkaline washing solution, or the like.

In the present embodiment, the lower limit of the calcination temperature setting is not particularly limited, but is preferable 600° C. or higher, and more preferably 650° C. or higher, from the viewpoint of increasing the charging capacity. Further, the upper limit of the calcination temperature setting is not particularly limited, but is preferably 1100° C. or lower, and more preferably 1050° C. or lower, from the viewpoint of preventing the volatilization of Li and obtaining a lithium composite metal oxide having a target composition.

The above-described upper limit values and lower limit values of the calcination temperature can be arbitrarily combined.

Specifically, the calcination temperature setting is preferably 600° C. or higher and 1100° C. or lower, and more preferably 650° C. or higher and 1050° C. or lower.

The calcination time is preferably 3 hours or more and 50 hours or less. When the calcination time exceeds 50 hours, the battery performance tends to be substantially inferior due to the volatilization of lithium. In other words, when the calcination time is 50 hours or less, lithium is less likely to volatilize, and the battery performance tends to be substantially excellent. When the calcination time is less than 3 hours, crystal development tends to be poor and battery performance tends to be poor. In other words, when the calcination time is 3 hours or more, the crystal develops well and the battery performance tends to be excellent. It is also effective to carry out temporary calcination before the above calcination. The temperature of the temporary calcination is preferably 300° C. or higher and 850° C. or lower for 1 to 10 hours.

When the temporary calcination time is 1 hour or more, the crystal development progresses satisfactorily and the battery performance can be improved.

Further, in calcination, an atmosphere, a dry air, an oxygen atmosphere, an inert atmosphere or the like is used according to a desired composition, and a plurality of heating steps are carried out if necessary.

The inert melting agent that can be used in the present embodiment is not particularly limited as long as the inert melting agent does not easily react with the mixture during the calcination. In the present embodiment, the inert melting agent may be at least one selected from the group consisting of fluoride, chloride, carbonate, sulfate, nitrate, phosphate, hydroxide, molybdate, and tungstate of at least one element (hereinafter referred to as "A") selected from the group consisting of Na, K, Rb, Cs, Ca, Mg, Sr, and Ba.

Examples of the fluoride of A include NaF (melting point: 993° C.), KF (melting point: 858° C.), RbF (melting point: 795° C.), CsF (melting point: 682° C.), $CaF_2$ (melting point: 1402° C.), $MgF_2$ (melting point: 1263° C.), $SrF_2$ (melting point: 1473° C.) and $BaF_2$ (melting point: 1355° C.).

Examples of the chloride of A include NaCl (melting point: 801° C.), KCl (melting point: 770° C.), RbCl (melting point: 718° C.), CsCl (melting point: 645° C.), $CaCl_2$ (melting point: 782° C.), $MgCl_2$ (melting point: 714° C.), $SrCl_2$ (melting point: 857° C.) and $BaCl_2$ (melting point: 963° C.).

Examples of the carbonate of A include $Na_2CO_3$ (melting point: 854° C.), $K_2CO_3$ (melting point: 899° C.), $Rb_2CO_3$ (melting point: 837° C.), $Cs_2CO_3$ (melting point: 793° C.), $CaCO_3$ (melting point: 825° C.), $MgCO_3$ (melting point: 990° C.), $SrCO_3$ (melting point: 1497° C.) and $BaCO_3$ (melting point: 1380° C.).

Examples of the sulfate of A include $Na_2SO_4$ (melting point: 884° C.), $K_2SO_4$ (melting point: 1069° C.), $Rb_2SO_4$ (melting point: 1066° C.), $Cs_2SO_4$ (melting point: 1005° C.), $CaSO_4$ (melting point: 1460° C.), $MgSO_4$ (melting point: 1137° C.), $SrSO_4$ (melting point: 1605° C.) and $BaSO_4$ (melting point: 1580° C.).

Examples of the nitrate of A include $NaNO_3$ (melting point: 310° C.), $KNO_3$ (melting point: 337° C.), $RbNO_3$ (melting point: 316° C.), $CsNO_3$ (melting point: 417° C.), $Ca(NO_3)_2$ (melting point: 561° C.), $Mg(NO_3)_2$, $Sr(NO_3)_2$ (melting point: 645° C.) and $Ba(NO_3)_2$ (melting point: 596° C.).

Examples of the phosphate of A include $Na_3PO_4$ (melting point: 75° C.), $K_3PO_4$ (melting point: 1340° C.), $Rb_3PO_4$, $Cs_3PO_4$, $Ca_3(PO_4)_2$, (melting point: 1670° C.), $Mg_3(PO_4)_2$ (melting point: 1184° C.), $Sr_3(PO_4)_2$ (melting point: 1727° C.) and $Ba_3(PO_4)_2$ (meting point: 1767° C.).

Examples of the hydroxide of A include NaOH (melting point: 318° C.), KOH (melting point: 360° C.), RbOH (melting point: 301° C.), CsOH (melting point: 272° C.), $Ca(OH)_2$ (melting point: 408° C.), $Mg(OH)_2$ (melting point: 350° C.), $Sr(OH)_2$ (melting point: 375° C.) and $Ba(OH)_2$ (melting point: 853° C.).

Examples of the molybdate of A include $Na_2MoO_4$ (melting point: 698° C.), $K_2MoO_4$ (melting point: 919° C.), $Rb_2MoO_4$ (melting point: 958° C.), $Cs_2MoO_4$ (melting point: 956° C.), $CaMoO_4$ (melting point: 1520° C.), $MgMoO_4$ (melting point: 1060° C.), $SrMoO_4$ (melting point: 1040° C.) and $BaMoO_4$ (melting point: 1460° C.).

Examples of the tungstate of A include $Na_2WO_4$ (melting point: 687° C.), $K_2WO_4$ (melting point: 933° C.), $Rb_2WO_4$, $Cs_2WO_4$, $CaWO_4$ (melting point: 1620° C.), $MgWO_4$, $SrWO_4$ (melting point: 1400° C.) and $BaWO_4$.

In the present embodiment, two or more of these inert melting agents may be used. When two or more inert melting agents are used, the melting point may be lowered. Further, among these inert melting agents, for obtaining a lithium composite metal oxide having higher crystallinity, it is preferable to use any one or combination of the hydroxide, carbonate, sulfate, and chloride of A. Further, A is preferably one or both of sodium (Na) and potassium (K). That is, among the above, the inert melting agent is particularly preferably one or more selected from the group consisting of NaOH, KOH, NaCl, KCl, $Na_2CO_3$, $K_2CO_3$, $Na_2SO_4$, and $K_2SO_4$.

In the present embodiment, $K_2SO_4$ or $Na_2SO_4$ is preferable as the inert melting agent.

In the present embodiment, the amount of the inert melting agent used during the calcination may be appropriately set. As for the amount of the inert melting agent used during the calcination, the ratio of the number of moles of the inert melting agent with respect to the total number of moles of the lithium compound and the inert melting agent is preferably 0.010 or more and 30 or less, more preferably 0.015 or more and 20 or less, and even more preferably 0.020 or more and 15 or less.

Pure water or an alkaline washing solution can be used for washing the inert melting agent remaining in the lithium composite metal oxide after calcination.

Examples of the alkaline washing solution include an aqueous solution of one or more anhydrides selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), and $K_2CO_3$ (potassium carbonate), and $(NH_4)_2CO_3$ (ammonium carbonate), and hydrates thereof. Further, ammonia can also be used as an alkali.

The temperature of the washing solution used for washing is preferably 15° C. or less, more preferably 10° C. or less, even more preferably 8° C. or less. By controlling the temperature of the washing solution within the above range which prevents the washing solution from freezing, lithium ions can be prevented from excessively leaching from the crystal structure of the lithium composite metal oxide into the washing solution during washing.

In the washing process, examples of the method of bringing the washing solution into contact with the lithium composite metal oxide include a method of adding the lithium composite metal oxide into an aqueous washing solution and stirring the resulting, a method of showering an aqueous washing solution on the lithium composite metal oxide, and a method of adding the lithium composite metal oxide into the aqueous washing solution, stirring the resulting, separating the lithium composite metal oxide from the aqueous washing solution, and then showering an aqueous washing solution on the separated lithium composite metal oxide.

The lithium composite metal oxide obtained by calcination is appropriately classified after pulverization to obtain the positive electrode active material for a lithium secondary battery applicable to the lithium secondary battery.

<Lithium Secondary Battery>

Next, the positive electrode using the positive electrode active material for a lithium secondary battery using the lithium composite metal oxide produced by the present embodiment as a positive electrode active material for a lithium secondary battery, and lithium secondary battery having this positive electrode will be described while explaining the configuration of the lithium secondary battery.

In one example of the lithium secondary battery of the present embodiment, the lithium secondary battery includes a positive electrode, a negative electrode, a separator interposed between the positive electrode and the negative electrode, and an electrolytic solution disposed between the positive electrode and the negative electrode.

Figure 1B:
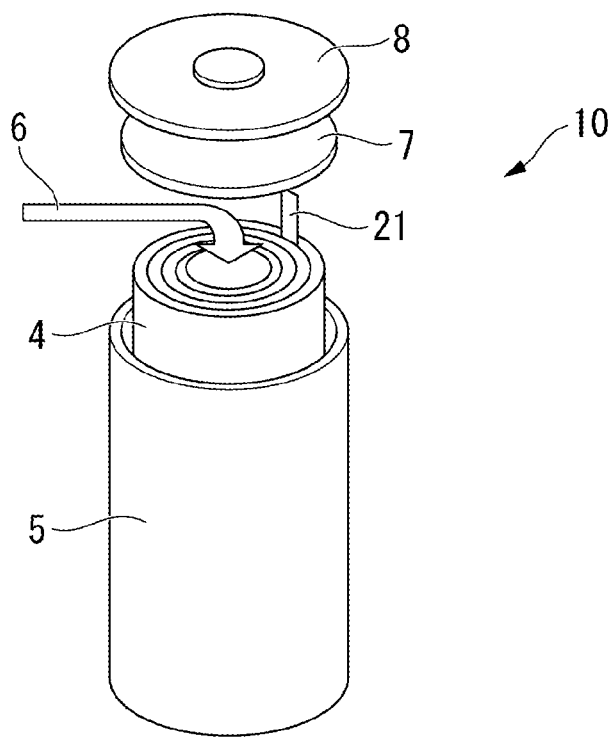
FIG. 1B is a schematic view showing one example of a lithium ion secondary battery.

Each of FIG. 1A and FIG. 1B is a schematic view illustrating an example of the lithium secondary battery of the present embodiment. A cylindrical lithium secondary battery 10 of the present embodiment is manufactured as described below.

First, as illustrated in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in an order of the separator 1, the positive electrode 2, the separator 1, and the negative electrode 3, and are wound into an electrode group 4.

Next, as illustrated in FIG. 1B, the electrode group 4 and an insulator (not shown) are placed in a battery can 5, followed by sealing the bottom of the can, and then an electrolytic solution 6 is impregnated into the electrode group 4 such that an electrolyte is disposed between the positive electrode 2 and the negative electrode 3. Further, the top section of the battery can 5 is sealed using a top insulator 7 and a sealing body 8, whereby the lithium secondary battery 10 can be produced.

The shape of the electrode group 4 may be, for example, of a columnar shape with its cross-section being round, oval, rectangular, or of a round-cornered rectangular shape, wherein the cross-section is perpendicular to the axis of winding of the electrode group 4.

As the shape of the lithium secondary battery including the aforementioned electrode group 4, it is possible to employ the shapes prescribed by IEC60086, which is the standard of batteries prescribed by the International Electrotechnical Commission (IEC), or JIS C 8500. Examples thereof include a cylindrical shape, an angular shape and the like.

The lithium secondary battery is not limited to the wound construction as described above, and may have a laminated construction obtained by laminating a positive electrode, a separator, a negative electrode, a separator, and so forth. Examples of the laminated lithium secondary battery include the so-called coin-type battery, button-type battery, and paper-type (or sheet-type) battery.

Hereinbelow, the respective components will be described.

(Positive Electrode)

The positive electrode of the present embodiment can be manufactured by, first, preparing a positive electrode mix including the aforementioned positive electrode active material, a conductive material and a binder, and causing the positive electrode mix to be supported on a positive electrode current collector.

(Conductive Material)

As the conductive material included in the positive electrode of the present embodiment, a carbonaceous material can be used. Examples of the carbonaceous material include a graphite powder, a carbon black (such as acetylene black) and a fibrous carbonaceous material. Since carbon black is in the form of microparticles and has a large surface area, the addition of only a small amount of the carbon black to the positive electrode mix increases the conductivity within the positive electrode, and improves the charge/discharge efficiency and the output performance as well; however, too large an amount of carbon black deteriorates the binding strength of the binder exerted not only between the positive electrode mix and the positive electrode current collector but also within the positive electrode mix, thereby becoming an adverse factor that increases an internal resistance.

The amount of the conductive material in the positive electrode mix is preferably 5 parts by mass or more and 20 parts by mass or less, relative to 100 parts by mass of the positive electrode active material. This amount may be decreased when using a fibrous carbonaceous material such as a graphitized carbon fiber or a carbon nanotube as the conductive material.

(Binder)

As the binder included in the positive electrode of the present embodiment, a thermoplastic resin can be used.

Examples of the thermoplastic resin include fluororesins such as polyvinylidene fluoride (hereinafter also referred to as PVdF), polytetrafluoroethylene (hereinafter also referred to as PTFE), ethylene tetrafluoride-propylene hexafluoride-vinylidene fluoride type copolymers, propylene hexafluoride-vinylidene fluoride type copolymers, and ethylene tetrafluoride-perfluorovinyl ether type copolymers; and polyolefin resins such as polyethylene and polypropylene.

Two or more of these thermoplastic resins may be used in the form of a mixture thereof. When a fluororesin and a polyolefin resin are used as the binder, it is possible to obtain a positive electrode mix capable of strong adhesive force relative to the positive electrode current collector as well as strong biding force within the positive electrode mix in itself by adjusting the ratio of the fluororesin to fall within the range of from 1% by mass to 10% by mass, and the ratio of the polyolefin resin to fall within the range of from 0.1% by mass to 2% by mass, based on the total mass of the positive electrode mix.

(Positive Electrode Current Collector)

As the positive electrode current collector included in the positive electrode of the present embodiment, it is possible to use a strip-shaped member composed of a metal material such as Al, Ni, or stainless steel as a component material. It is especially preferred to use a current collector which is made of Al and is shaped into a thin film because of its high processability and low cost.

Examples of the method for causing the positive electrode mix to be supported on the positive electrode current collector include a method in which the positive electrode mix is press-formed on the positive electrode current collector. Alternatively, the positive electrode mix may be caused to be supported on the positive electrode current collector by a method including producing a paste from the positive electrode mix using an organic solvent, applying the obtained paste of the positive electrode mix to at least one surface of the positive electrode current collector, drying the paste, and press-bonding the resultant to the current collector.

Examples of the organic solvent that can be used for producing the paste from the positive electrode mix include amine-based solvents such as N,N-dimethylaminopropylamine and diethylene triamine; ether-based solvents such as tetrahydrofuran; ketone-based solvents such as methyl ethyl ketone; ester-based solvents such as methyl acetate; and amide-based solvents such as dimethyl acetamide, and N-methyl-2-pyrrolidone (hereinafter, sometimes also referred to as "NMP").

Examples of the method for applying the paste of the positive electrode mix to the positive electrode current collector include a slit die coating method, a screen coating method, a curtain coating method, a knife coating method, a gravure coating method, and an electrostatic spray method.

The positive electrode can be produced by the method as described above.

(Negative Electrode)

The negative electrode included in the lithium secondary battery of the present embodiment is not particularly limited as long as it is capable of doping and de-doping lithium ions at a potential lower than the positive electrode, and examples thereof include an electrode comprising a negative electrode current collector having supported thereon a negative electrode mix including a negative electrode active material, and an electrode constituted solely of a negative electrode active material.

(Negative Electrode Active Material)

Examples of the negative electrode active material included in the negative electrode include materials which are carbonaceous materials, chalcogen compounds (oxides, sulfides, etc.), nitrides, metals or alloys, and allow lithium ions to be doped or de-doped at a potential lower than the positive electrode.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon represented by the formula: $SiO_x$ (wherein x is a positive integer) such as $SiO_2$ and SiO; oxides of titanium represented by the formula: $TiO_x$ (wherein x is a positive integer) such as $TiO_2$ and TiO; oxides of vanadium represented by the formula: $VO_x$ (wherein x is a positive integer) such as $V_2O_5$ and $VO_2$;

oxides of iron represented by the formula: $FeO_x$ (wherein x is a positive integer) such as $Fe_3O_4$, $Fe_2O_3$ and FeO; oxides of tin represented by the formula: $SnO_x$ (wherein x is a positive integer) such as $SnO_2$ and SnO; oxides of tungsten represented by the formula: $WO_x$ (wherein x is a positive integer) such as $WO_3$ and $WO_2$; and metal composite oxides containing lithium, titanium or vanadium such as $Li_4Ti_5O_{12}$ and $LiVO_2$.

Examples of sulfides that can be used as the negative electrode active material include sulfides of titanium represented by the formula: $TiS_x$ (wherein x is a positive integer) such as $Ti_2S_3$, $TiS_2$ and TiS; sulfides of vanadium represented by the formula: $VS_x$ (wherein x is a positive integer) such as $V_3S_4$, $VS_2$ and VS; sulfides of iron represented by the formula: $FeS_x$ (wherein x is a positive integer) such as $Fe_3S_4$, $FeS_2$ and FeS; sulfides of molebdenum represented by the formula: $MoS_x$ (wherein x is a positive integer) such as $Mo_2S_3$ and $MoS_2$; sulfides of tin represented by the formula: $SnS_x$ (wherein x is a positive integer) such as $SnS_2$ and SnS; sulfides of tungsten represented by the formula: $WS_x$ (wherein x is a positive integer) such as $WS_2$; sulfides of antimony represented by the formula: $SbS_x$ (wherein x is a positive integer) such as $Sb_2S_3$; and sulfides of selenium represented by the formula: $SeS_x$ (wherein x is a positive integer) such as $Se_5S_3$, $SeS_2$ and SeS.

Examples of nitrides that can be used as the negative electrode active material include lithium-containing nitrides such as $Li_3N$ and $Li_{3-x}A_xN$ (wherein A is one or both of Ni and Co, and $0<x<3$).

Each of the aforementioned carbonaceous materials, oxides, sulfides and nitrides may be used alone or in combination. Further, each of the aforementioned carbonaceous materials, oxides, sulfides and nitrides may be crystalline or amorphous.

Examples of metals that can be used as the negative electrode active material include lithium metals, silicon metals, tin metals and the like.

Examples of alloys that can be used as the negative electrode active material include lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

The metals or alloys are processed into, for example, a foil, and are in many cases used alone as an electrode.

Among the aforementioned negative electrode active materials, carbonaceous materials composed mainly of graphite such as natural graphite or artificial graphite are preferably used for reasons such as follows: the potential of the negative electrode hardly changes during charging from an uncharged state to a fully charged state (the potential flatness is favorable), the average discharge potential is low, the capacity retention after repeated charge/discharge cycles is high (the cycle performance is favorable), and the like. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

The negative electrode mix may include a binder as necessary. As the binder, a thermoplastic resin can be used, and examples thereof include PVdF, thermoplastic polyimides, carboxymethyl cellulose, polyethylene, and polypropylene.

(Negative Electrode Current Collector)

Examples of the negative electrode current collector included in the negative electrode include a strip-shaped member composed of a metal material such as Cu, Ni or stainless steel as a component material. Among these, it is preferred to use a current collector which is made of Cu and is shaped into a thin film, since Cu is unlikely to form an alloy with lithium and can be easily processed.

Examples of the method for causing the negative electrode mix to be supported on the above-described negative electrode current collector include, as in the case of the positive electrode, a press forming method, and a method in which a paste of the negative electrode mix obtained by using a solvent and the like, is applied to and dried on the negative electrode current collector, and the resulting is press-bonded to the current collector.

(Separator)

As the separator used in the lithium secondary battery of the present embodiment, for example, it is possible to use one that is formed of a material such as a polyolefin resin (e.g., polyethylene or polypropylene), a fluororesin or a nitrogen-containing aromatic polymer, and has a form of a porous film, a nonwoven fabric, a woven fabric or the like. The separator may be composed of two or more of the materials mentioned above, or may be formed by laminating these materials.

In the present embodiment, for satisfactory permeation of the electrolyte through the separator during the use (charge and discharge) of the battery, the separator preferably has an air resistance of 50 sec/100 cc or more and 300 sec/100 cc or less, more preferably 50 sec/100 cc or more and 200 sec/100 cc or less, as measured by the Gurley method prescribed in JIS P 8117: 2009.

The porosity of the separator is preferably 30% by volume or more and 80% by volume or less, and more preferably 40% by volume or more and 70% by volume or less. The separator may be a laminate of separators having different porosities.

(Electrolytic Solution)

The electrolytic solution used in the lithium secondary battery of the present embodiment contains an electrolyte and an organic solvent.

Examples of the electrolyte contained in the electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein "BOB" means bis(oxalato)borate), LiFSI (wherein "FSI" means bis(fluorosulfonyl)imide), a lithium salt of a lower aliphatic carboxylic acid, and $LiAlCl_4$. Two or more of these salts may be used in the form of a mixture thereof. Among these electrolytes, it is preferred to use at least one fluorine-containing salt selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$.

As the organic solvent included in the electrolytic solution, it is possible to use, for example, a carbonate such as propylene carbonate, ethylene carbonate, dimethyl carbonate, diethyl carbonate, ethyl methyl carbonate, 4-trifluoromethyl-1,3-dioxolane-2-one, and 1,2-di(methoxycarbonyloxy)ethane; an ether such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyl tetrahydrofuran; an ester such as methyl formate, methyl acetate, and γ-butyrolactone; a nitrile such as acetonitrile and butyronitrile; an amide such as N,N-dimethyl formamide and N,N-dimethylacetoamide; a carbamate such as 3-methyl-2-oxazolidone; a sulfur-containing compound such as sulfolane, dimethyl sulfoxide, and 1,3-propane sultone; or a solvent produced by further introducing a fluoro group into the above-described organic solvent (a solvent in which one or more hydrogen atoms included in the organic solvent is substituted by a fluorine atom).

As the organic solvent, it is preferable to use a mixture of two or more of these organic solvents. Among the aforementioned organic solvents, a solvent mixture including a carbonate is preferable, and a solvent mixture of a cyclic carbonate and a non-cyclic carbonate and a solvent mixture of a cyclic carbonate and an ether are more preferable. As the solvent mixture of a cyclic carbonate and a non-cyclic carbonate, a solvent mixture including ethylene carbonate, dimethyl carbonate, and ethyl methyl carbonate is preferable. An electrolytic solution using the aforementioned solvent mixture has many advantages such as a wider operational temperature range, a low tendency of deterioration even after charge/discharge at a high current rate, a low tendency of deterioration even when used for a long period of time, and a low decomposability even when a graphite material such as natural graphite or artificial graphite is used as the active material for the negative electrode.

For improving the stability of the obtained lithium secondary battery, it is preferable to use an electrolytic solution including a lithium salt containing fluorine such as $LiPF_6$ and an organic solvent having a fluorine substituent. A solvent mixture including an ether having a fluorine substituent such as pentafluoropropyl methyl ether or 2,2,3,3-tetrafluoropropyl difluoromethyl ether and dimethyl carbonate is more preferable since a high capacity retention is achievable even when the battery is charged and discharged at a high current rate.

A solid electrolyte may be used instead of the aforementioned electrolytic solution. As the solid electrolyte, it is possible to use, for example, an organic polymer electrolyte such as a polyethylene oxide-type polymeric compound or a polymeric compound including at least one type of polymer chain selected from a polyorganosiloxane chain or a polyoxyalkylene chain. It is also possible to use the so-called gel-type electrolyte including a polymer retaining therein a non-aqueous electrolytic solution. Further, it is also possible to use an inorganic solid electrolyte including a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$. Mixture of two or more of these types of inorganic solid electrolytes can be used. In some cases, the use of such a solid electrolyte may further improve the safety of the lithium secondary battery.

In the lithium secondary battery of the present embodiment, the solid electrolyte, when used, may serve as a separator. In such a case, the separator may be omitted.

Since the positive electrode active material having the above-described configuration uses the lithium composite metal oxide produced by the present embodiment described above, it is possible to improve the cycle maintenance rate of the lithium secondary battery using the positive electrode active material.

Further, since the positive electrode having the above configuration has the positive electrode active material for a lithium secondary battery having the above-described configuration, the cycle maintenance rate of the lithium secondary battery can be improved.

Further, since the lithium secondary battery having the above-described configuration has the above-described positive electrode, it is a secondary battery having a high cycle maintenance rate.

The cycle performance of the lithium secondary battery obtained by using the lithium composite metal oxide according to the present embodiment can be evaluated by the cycle maintenance rate (%) obtained according to the method described in Examples described later.

The cycle maintenance rate of the lithium secondary battery obtained by using the lithium composite metal oxide according to the present embodiment is preferably 78% or more and 100% or less, more preferably 80% or more and 100% or less, and even more preferably 81% or more and 100% or less.

EXAMPLES

Hereinbelow, the present invention will be described in more detail with reference to the Examples.

<<Measurement of Requirement (1)>>

The powder X-ray diffraction analysis was carried out using an X-ray diffractometer (UltimaIV, manufactured by Rigaku Corporation). The lithium composite metal oxide was charged onto a specially designed substrate, and the measurement was carried out using a Cu-Kα radiation source under the conditions where the diffraction angle is in the range of 2θ=10° to 90°, sampling width is 0.02°, and scan speed is 4°/min, thereby obtaining a powder X-ray diffraction pattern.

Using the integrated powder X-ray analysis software JADE, the half width A of the diffraction peak in the range of 2θ=64.5±1° and the half width B of the diffraction peak in the range of 2θ=44.4±1° was calculated from the powder X-ray diffraction pattern. The ratio (A/B) was calculated from the obtained half width A and half width B. The half width A measured at this time is shown in Table 1 as requirement (1)-1.

<<Measurement of Requirement (2)>>

0.1 g of a lithium composite metal oxide was added to 50 ml of 0.2 wt % aqueous solution of sodium hexametaphosphate, thereby obtaining a dispersion with the powder of the lithium composite metal oxide dispersed therein. Next, the obtained dispersion was subjected to a particle size distribution measurement using a laser scattering particle size distribution measuring apparatus (Microtrack MT3300EXII, manufactured by Microtrack Bell Co., Ltd.), whereby the volume-based cumulative particle size distribution curve was obtained. From the obtained cumulative particle size distribution curve, the value of the particle size at the point where the cumulative volume from the smallest particle side was 10% was the volume-based 10% cumulative particle size ($D_{10}$) (μm), the value of the particle size at the point where the cumulative volume from the smallest particle side was 50% was the volume-based 50% cumulative particle size ($D_{50}$) (μm), and the value of the particle size at the point where the cumulative volume from the smallest particle side was 90% was the volume-based 90% cumulative particle size ($D_{90}$) (μm), when the whole of the cumulative volume was 100%.

<<Measurement of Requirement (3)>>

The powder X-ray diffraction analysis was carried out using an X-ray diffractometer (UltimaIV, manufactured by Rigaku Corporation). The lithium composite metal oxide was charged onto a specially designed substrate, and the measurement was carried out using a Cu-Kα radiation source under the conditions where the diffraction angle is in the range of 2θ=10° to 90°, sampling width is 0.02°, and scan speed is 4°/min, thereby obtaining a powder X-ray diffraction pattern.

Using the integrated powder X-ray analysis software JADE, the integral intensity $I_1$ in the range of $2\theta=64.5\pm1°$ and the integral intensity $I_2$ in the range of $2\theta=18.5\pm1°$ were obtained from the powder X-ray diffraction pattern, and the ratio ($I_2/I_1$) of the integral intensity $I_2$ to the integral intensity $I_1$ was calculated.

<<Composition Analysis>>

The composition analysis of the lithium composite metal oxide manufactured by the method described below was carried out using an inductively coupled plasma emission spectrometer (SPS3000, manufactured by SII Nano Technology Inc.) after the powder of the lithium composite metal oxide was dissolved in hydrochloric acid.

<Production of Positive Electrode for Lithium Secondary Battery>

A lithium composite metal oxide obtained by a production method described below, a conductive material (acetylene black), and a binder (PVdF) were mixed and kneaded so as to obtain a composition of the lithium composite metal oxide, the conductive material, and the binder at a mass ratio of 92:5:3, thereby preparing a paste-form positive electrode mix. In preparation of the positive electrode mix, N-methyl-2-pyrrolidone was used as an organic solvent.

The obtained positive electrode mix was applied to a 40 μm-thick Al foil which served as a current collector, and was dried in a vacuum at 150° C. for eight hours, thereby obtaining a positive electrode for a lithium secondary battery. The electrode area of the positive electrode for a lithium secondary battery was set to 1.65 cm².

<Production of Lithium Secondary Battery (Coin-type Half Cell)>

The following operations were carried out in an argon atmosphere within a glove box.

The positive electrode produced in the <Production of Positive Electrode for Lithium Secondary Battery> was placed on a bottom lid of a coin cell for a coin-type battery R2032 (manufactured by Hohsen Corporation) with the aluminum foil surface facing downward, and a laminate film separator (a separator including a heat-resistant porous layer laminated on a polyethylene porous film (thickness: 16 μm)) was placed on the positive electrode. 300 μl of an electrolytic solution was injected thereinto. The electrolytic solution used was prepared by dissolving LiPF$_6$ in a liquid mixture of ethylene carbonate (hereinafter, sometimes also referred to as "EC"), dimethyl carbonate (hereinafter, sometimes also referred to as "DMC"), and ethyl methyl carbonate (hereinafter, sometimes also referred to as "EMC") at a volume ratio of 30:35:35 such that the amount of LiPF$_6$ becomes 1.0 mol/l. Hereinafter, the electrolytic solution may also be referred to as "LiPF$_6$/EC+DMC+EMC".

Next, metal lithium used as a negative electrode was placed on the laminate film separator, covered with a top lid through a gasket, and swaged using a swage, thereby producing a lithium secondary battery (coin-type half cell R2032, hereinafter sometimes referred to as "half cell").

Charge/Discharge Test

Using the half cell produced by the above method, a charge/discharge test was carried out under the conditions shown below, and the cycle maintenance rate was calculated.

Conditions for Cycle Test (When 1-y-z-w≥0.8 in the composition formula (I))

Test temperature: 25° C.

Constant Current/Constant Voltage Charging: maximum charge voltage of 4.35 V and charge current of 0.5 CA.

Constant Current Discharging: minimum discharge voltage of 2.8 V and discharge current of 1 CA.

(When 1-y-z-w<0.8 in the composition formula (I))

Test temperature: 25° C.

Constant Current/Constant Voltage Charging: maximum charge voltage of 4.2 V and charge current of 0.5 CA.

Constant Current Discharging: minimum discharge voltage of 2.5 V and discharge current of 1 CA.

The discharge capacity of the first cycle was defined as the cycle initial capacity, and the value obtained by dividing the discharge capacity of the 50th cycle by the cycle initial capacity was calculated, and this value was defined as the cycle maintenance rate.

Example 1

1. Production of Precursor (Coprecipitate) of Lithium Composite Metal Oxide

Into a reaction vessel equipped with a stirrer and an overflow pipe was charged water, followed by addition of an aqueous sodium hydroxide solution. The temperature of the resulting liquid was maintained at 70° C.

An aqueous nickel sulfate solution, an aqueous cobalt sulfate solution and an aqueous manganese sulfate solution were mixed together such that the atomic ratio between nickel atoms, cobalt atoms and manganese atoms became 88:8:4, to thereby prepare a raw material mixture solution.

Then, the obtained raw material mixture solution and an aqueous ammonium sulfate solution as a complexing agent were continuously added to the reaction vessel with stirring. An aqueous sodium hydroxide solution was dropwise added thereto at an appropriate timing such that the pH of the solution in the reaction vessel became 11.39, thereby obtaining nickel cobalt manganese composite metal hydroxide particles. The nickel cobalt manganese composite metal hydroxide particles were washed, dehydrated, washed, dehydrated, separated and dried to obtain a hydroxide raw material powder 1.

The obtained hydroxide raw material powder 1 was pulverized using a jet mill by setting a pulverized gas pressure of 0.6 MPa to obtain a precursor 1.

2. Production and Evaluation of Lithium Composite Metal Oxide

The obtained precursor 1, lithium hydroxide weighed so that the amount (molar ratio) of Li with respect to the total amount 1 of Ni, Co, and Mn contained in the obtained precursor 1 was 1.15, and potassium sulfate weighed so that the amount (molar ratio) of potassium sulfate with respect to the total amount of lithium hydroxide and potassium sulfate as an inert melting agent was 0.1 were mixed in a mortar to obtain a mixture.

Then, the obtained mixture was heated at 760° C. for 10 hours in an O2 atmosphere and then cooled to room temperature to obtain a calcination product.

The obtained calcination product was pulverized, dispersed in pure water at 5° C., and then dehydrated to obtain a powder. Further, the powder was washed with pure water adjusted to a liquid temperature of 5° C., dehydrated, and dried at 150° C. to obtain a powdery lithium composite metal oxide 1.

As a result of the composition analysis of the obtained lithium composite metal oxide 1, x=0.04, y=0.08, z=0.04, and w=0 in the composition formula (I).

3. Charge/Discharge Test of Non-Aqueous Electrolyte Secondary Battery

A coin-type battery was produced using the lithium composite metal oxide 1, and a charge/discharge test was performed. The cycle maintenance rate was 82.6%.

Example 2

1. Production of Precursor (Coprecipitate) of Lithium Composite Metal Oxide

The hydroxide raw material powder 1 obtained in the process of Example 1 was pulverized using a jet mill at a pulverized gas pressure of 0.4 MPa to obtain a precursor 2.

2. Production and Evaluation of Lithium Composite Metal Oxide

The obtained precursor 2, lithium hydroxide weighed so that the amount (molar ratio) of Li with respect to the total amount 1 of Ni, Co, and Mn contained in the obtained precursor 2 was 1.15, and potassium sulfate weighed so that the amount (molar ratio) of potassium sulfate with respect to the total amount of lithium hydroxide and potassium sulfate as an inert melting agent was 0.1 were mixed in a mortar to obtain a mixture.

Then, the obtained mixture was heated at 760° C. for 10 hours in an O2 atmosphere and then cooled to room temperature to obtain a calcination product.

The obtained calcination product was pulverized, dispersed in pure water at 5° C., and then dehydrated to obtain a powder. Further, the powder was washed with pure water adjusted to a liquid temperature of 5° C., dehydrated, and dried at 150° C. to obtain a powdery lithium composite metal oxide 2.

As a result of the composition analysis of the obtained lithium composite metal oxide 2, $x=0.04$, $y=0.08$, $z=0.04$, and $w=0$ in the composition formula (I).

3. Charge/Discharge Test of Non-Aqueous Electrolyte Secondary Battery

A coin-type battery was produced using the lithium composite metal oxide 2, and a charge/discharge test was performed. The cycle maintenance rate was 82.9%.

Example 3

1. Production of Precursor (Coprecipitate) of Lithium Composite Metal Oxide

The hydroxide raw material powder 1 obtained in the process of Example 1 was pulverized using a counter jet mill by setting a pulverized gas pressure of 0.59 MPa, a supply speed of 2 kg/hour, a classification rotation speed of 17000 rpm, and an air volume of 1.2 m³/min to obtain a precursor 3.

2. Production and Evaluation of Lithium Composite Metal Oxide

The obtained precursor 3, lithium hydroxide weighed so that the amount (molar ratio) of Li with respect to the total amount 1 of Ni, Co, and Mn contained in the obtained precursor 3 was 1.26, and potassium sulfate weighed so that the amount (molar ratio) of potassium sulfate with respect to the total amount of lithium hydroxide and potassium sulfate as an inert melting agent was 0.1 were mixed in a mortar to obtain a mixture.

Then, the obtained mixture was heated at 790° C. for 10 hours in an O2 atmosphere and then cooled to room temperature to obtain a calcination product.

The obtained calcination product was pulverized, dispersed in pure water at 5° C., and then dehydrated to obtain a powder. Further, the powder was washed with pure water adjusted to a liquid temperature of 5° C., dehydrated, heated at 80° C. for 15 hours, and then dried by continuously heating at 150° C. for 9 hours to obtain a powdery lithium composite metal oxide 3.

As a result of the composition analysis of the obtained lithium composite metal oxide 3, $x=0.05$, $y=0.08$, $z=0.04$, and $w=0$ in the composition formula (I).

3. Charge/Discharge Test of Non-Aqueous Electrolyte Secondary Battery

A coin-type battery was produced using the lithium composite metal oxide 3, and a charge/discharge test was performed. The cycle maintenance rate was 81.3%.

Example 4

1. Production of Precursor (Coprecipitate) of Lithium Composite Metal Oxide

The hydroxide raw material powder 1 obtained in the process of Example 1 was pulverized using a counter jet mill by setting a pulverized gas pressure of 0.59 MPa, a supply speed of 2 kg/hour, a classification rotation speed of 17000 rpm, and an air volume of 1.2 m³/min to obtain a precursor 4.

2. Production and Evaluation of Lithium Composite Metal Oxide

The obtained precursor 4, lithium hydroxide weighed so that the amount (molar ratio) of Li with respect to the total amount 1 of Ni, Co, and Mn contained in the obtained precursor 4 was 1.26, and potassium sulfate weighed so that the amount (molar ratio) of potassium sulfate with respect to the total amount of lithium hydroxide and potassium sulfate as an inert melting agent was 0.1 were mixed in a mortar to obtain a mixture.

Then, the obtained mixture was heated at 820° C. for 10 hours in an O2 atmosphere and then cooled to room temperature to obtain a calcination product.

The obtained calcination product was pulverized, dispersed in pure water at 5° C., and then dehydrated to obtain a powder. Further, the powder was washed with pure water adjusted to a liquid temperature of 5° C., dehydrated, heated at 80° C. for 15 hours, and then dried by continuously heating at 150° C. for 9 hours to obtain a powdery lithium composite metal oxide 4.

As a result of the composition analysis of the obtained lithium composite metal oxide 4, $x=0.03$, $y=0.08$, $z=0.04$, and $w=0$ in the composition formula (I).

3. Charge/Discharge Test of Non-Aqueous Electrolyte Secondary Battery

A coin-type battery was produced using the lithium composite metal oxide 4, and a charge/discharge test was performed. The cycle maintenance rate was 86.7%.

Example 5

1. Production of Precursor (Coprecipitate) of Lithium Composite Metal Oxide

The hydroxide raw material powder 1 obtained in the process of Example 1 was pulverized using a counter jet mill by setting a pulverized gas pressure of 0.59 MPa, a supply speed of 2 kg/hour, a classification rotation speed of 17000 rpm, and an air volume of 1.2 m³/min to obtain a precursor 5.

2. Production and Evaluation of Lithium Composite Metal Oxide

The obtained precursor 5, lithium hydroxide weighed so that the amount (molar ratio) of Li with respect to the total amount 1 of Ni, Co, and Mn contained in the obtained precursor 5 was 1.26, and potassium sulfate weighed so that the amount (molar ratio) of potassium sulfate with respect to the total amount of lithium hydroxide and potassium sulfate as an inert melting agent was 0.05 were mixed in a mortar to obtain a mixture.

Then, the obtained mixture was heated at 820° C. for 10 hours in an 02 atmosphere and then cooled to room temperature to obtain a calcination product.

The obtained calcination product was pulverized, dispersed in pure water at 5° C., and then dehydrated to obtain a powder. Further, the powder was washed with pure water adjusted to a liquid temperature of 5° C., dehydrated, heated at 80° C. for 15 hours, and then dried by continuously heating at 150° C. for 9 hours to obtain a powdery lithium composite metal oxide 5.

As a result of the composition analysis of the obtained lithium composite metal oxide 5, $x=0.02$, $y=0.08$, $z=0.04$, and $w=0$ in the composition formula (I).

3. Charge/Discharge Test of Non-Aqueous Electrolyte Secondary Battery

A coin-type battery was produced using the lithium composite metal oxide 5, and a charge/discharge test was performed. The cycle maintenance rate was 87.9%.

Example 6

1. Production of Precursor (Coprecipitate) of Lithium Composite Metal Oxide

The hydroxide raw material powder 1 obtained in the process of Example 1 was pulverized using a counter jet mill by setting a pulverized gas pressure of 0.59 MPa, a supply speed of 2 kg/hour, a classification rotation speed of 17000 rpm, and an air volume of 1.2 m³/min to obtain a precursor 6.

2. Production and Evaluation of Lithium Composite Metal Oxide

The obtained precursor 6, lithium hydroxide weighed so that the amount (molar ratio) of Li with respect to the total amount 1 of Ni, Co, and Mn contained in the obtained precursor 6 was 1.26, and potassium sulfate weighed so that the amount (molar ratio) of potassium sulfate with respect to the total amount of lithium hydroxide and potassium sulfate as an inert melting agent was 0.02 were mixed in a mortar to obtain a mixture.

Then, the obtained mixture was heated at 820° C. for 10 hours in an 02 atmosphere and then cooled to room temperature to obtain a calcination product.

The obtained calcination product was pulverized, dispersed in pure water at 5° C., and then dehydrated to obtain a powder. Further, the powder was washed with pure water adjusted to a liquid temperature of 5° C., dehydrated, heated at 80° C. for 15 hours, and then dried by continuously heating at 150° C. for 9 hours to obtain a powdery lithium composite metal oxide 6.

As a result of the composition analysis of the obtained lithium composite metal oxide 6, $x=0.02$, $y=0.08$, $z=0.04$, and $w=0$ in the composition formula (I).

3. Charge/Discharge Test of Non-Aqueous Electrolyte Secondary Battery

A coin-type battery was produced using the lithium composite metal oxide 6, and a charge/discharge test was performed. The cycle maintenance rate was 87.9%.

Example 7

1. Production of Precursor (Coprecipitate) of Lithium Composite Metal Oxide

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 91:7:2, to thereby prepare a raw material mixture solution.

Then, the obtained raw material mixture solution and an aqueous ammonium sulfate solution as a complexing agent were continuously added to the reaction vessel with stirring. An aqueous sodium hydroxide solution was dropwise added thereto at an appropriate timing such that the pH of the solution in the reaction vessel became 12.5, thereby obtaining nickel cobalt manganese composite metal hydroxide particles. The nickel cobalt manganese composite metal hydroxide particles were washed, dehydrated, washed, dehydrated, separated and dried to obtain a hydroxide raw material powder 2.

The obtained hydroxide raw material powder 2 was pulverized using a counter jet mill by setting a pulverized gas pressure of 0.59 MPa, a supply speed of 2 kg/hour, a classification rotation speed of 17000 rpm, and an air volume of 1.2 m³/min to obtain a precursor 7.

2. Production and Evaluation of Lithium Composite Metal Oxide

The obtained precursor 7, lithium hydroxide weighed so that the amount (molar ratio) of Li with respect to the total amount 1 of Ni, Co, and Mn contained in the obtained precursor 7 was 1.26, and potassium sulfate weighed so that the amount (molar ratio) of potassium sulfate with respect to the total amount of lithium hydroxide and potassium sulfate as an inert melting agent was 0.10 were mixed in a mortar to obtain a mixture.

Then, the obtained mixture was heated at 790° C. for 10 hours in an $O_2$ atmosphere and then cooled to room temperature to obtain a calcination product.

The obtained calcination product was pulverized, dispersed in pure water at 5° C., and then dehydrated to obtain a powder. Further, the powder was washed with pure water adjusted to a liquid temperature of 5° C., dehydrated, heated at 80° C. for 15 hours, and then dried by continuously heating at 150° C. for 9 hours to obtain a powdery lithium composite metal oxide 7.

As a result of the composition analysis of the obtained lithium composite metal oxide 7, $x=0.03$, $y=0.07$, $z=0.02$, and $w=0$ in the composition formula (I).

3. Charge/Discharge Test of Non-Aqueous Electrolyte Secondary Battery

A coin-type battery was produced using the lithium composite metal oxide 7, and a charge/discharge test was performed. The cycle maintenance rate was 84.5%.

Example 8

1. Production of Precursor (Coprecipitate) of Lithium Composite Metal Oxide

Into a reaction vessel equipped with a stirrer and an overflow pipe was charged water, followed by addition of an aqueous sodium hydroxide solution. The temperature of the resulting liquid was maintained at 30° C.

An aqueous nickel sulfate solution, an aqueous cobalt sulfate solution and an aqueous manganese sulfate solution were mixed together such that the atomic ratio between nickel atoms, cobalt atoms and manganese atoms became 50:20:30, to thereby prepare a raw material mixture solution.

Then, the obtained raw material mixture solution and an aqueous ammonium sulfate solution as a complexing agent were continuously added to the reaction vessel with stirring. An aqueous sodium hydroxide solution was dropwise added thereto at an appropriate timing such that the pH of the solution in the reaction vessel became 12.1, thereby obtaining nickel cobalt manganese composite metal hydroxide particles. The nickel cobalt manganese composite metal hydroxide particles were washed, dehydrated, washed, dehydrated, separated and dried to obtain a hydroxide raw material powder 3.

The obtained hydroxide raw material powder 3 was pulverized using a jet mill by setting a pulverized gas pressure of 0.4 MPa to obtain a precursor 8.

2. Production and Evaluation of Lithium Composite Metal Oxide

The obtained precursor 8, lithium hydroxide weighed so that the amount (molar ratio) of Li with respect to the total amount 1 of Ni, Co, and Mn contained in the obtained precursor 8 was 1.26, and potassium sulfate weighed so that the amount (molar ratio) of potassium sulfate with respect to the total amount of lithium hydroxide and potassium sulfate as an inert melting agent was 0.10 were mixed in a mortar to obtain a mixture.

Then, the obtained mixture was heated at 940° C. for 5 hours in an $O_2$ atmosphere and then cooled to room temperature to obtain a calcination product.

The obtained calcination product was pulverized, dispersed in pure water at 5° C., and then dehydrated to obtain a powder. Further, the powder was washed with pure water adjusted to a liquid temperature of 5° C., dehydrated, heated at 80° C. for 15 hours, and then dried by continuously heating at 150° C. for 9 hours to obtain a powdery lithium composite metal oxide 8.

As a result of the composition analysis of the obtained lithium composite metal oxide 8, x=0.2, y=0.20, z=0.30, and w=0 in the composition formula (I).

3. Charge/Discharge Test of Non-Aqueous Electrolyte Secondary Battery

A coin-type battery was produced using the lithium composite metal oxide 8, and a charge/discharge test was performed. The cycle maintenance rate was 86.3%.

Comparative Example 1

1. Production of Precursor (Coprecipitate) of Lithium Composite Metal Oxide

The hydroxide raw material powder 1 obtained in the process of Example 1 was pulverized using a jet mill by setting a pulverized gas pressure of 0.8 MPa to obtain a precursor 9.

2. Production and Evaluation of Lithium Composite Metal Oxide

The obtained precursor 9, lithium hydroxide weighed so that the amount (molar ratio) of Li with respect to the total amount 1 of Ni, Co, and Mn contained in the obtained precursor 9 was 1.15, and potassium sulfate weighed so that the amount (molar ratio) of potassium sulfate with respect to the total amount of lithium hydroxide and potassium sulfate as an inert melting agent was 0.1 were mixed in a mortar to obtain a mixture.

Then, the obtained mixture was heated at 760° C. for 10 hours in an 02 atmosphere and then cooled to room temperature to obtain a calcination product.

The obtained calcination product was pulverized, dispersed in pure water at 5° C., and then dehydrated to obtain a powder. Further, the powder was washed with pure water adjusted to a liquid temperature of 5° C., dehydrated, and dried at 150° C. to obtain a powdery lithium composite metal oxide 9.

As a result of the composition analysis of the obtained lithium composite metal oxide 9, x=0.05, y=0.08, z=0.04, and w=0 in the composition formula (I).

3. Charge/Discharge Test of Non-Aqueous Electrolyte Secondary Battery

A coin-type battery was produced using the lithium composite metal oxide 9, and a charge/discharge test was performed. The cycle maintenance rate was 78.2%.

Comparative Example 2

1. Production of Precursor (Coprecipitate) of Lithium Composite Metal Oxide

The hydroxide raw material powder 1 obtained in the process of Example 1 was used as the precursor 10.

2. Production and Evaluation of Lithium Composite Metal Oxide

The obtained precursor 10, lithium hydroxide weighed so that the amount (molar ratio) of Li with respect to the total amount 1 of Ni, Co, and Mn contained in the obtained precursor 10 was 1.15, and potassium sulfate weighed so that the amount (molar ratio) of potassium sulfate with respect to the total amount of lithium hydroxide and potassium sulfate as an inert melting agent was 0.1 were mixed in a mortar to obtain a mixture.

Then, the obtained mixture was heated at 760° C. for 10 hours in an 02 atmosphere and then cooled to room temperature to obtain a calcination product.

The obtained calcination product was pulverized, dispersed in pure water at 5° C., and then dehydrated to obtain a powder. Further, the powder was washed with pure water adjusted to a liquid temperature of 5° C., dehydrated, and dried at 150° C. to obtain a powdery lithium composite metal oxide 10.

As a result of the composition analysis of the obtained lithium composite metal oxide 10, x=0.05, y=0.08, z=0.04, and w=0 in the composition formula (I).

3. Charge/Discharge Test of Non-Aqueous Electrolyte Secondary Battery

A coin-type battery was produced using the lithium composite metal oxide 10, and a charge/discharge test was performed. The cycle maintenance rate was 72.9%.

Comparative Example 3

1. Production of Precursor (Coprecipitate) of Lithium Composite Metal Oxide

Into a reaction vessel equipped with a stirrer and an overflow pipe was charged water, followed by addition of an aqueous sodium hydroxide solution. The temperature of the resulting liquid was maintained at 30° C.

An aqueous nickel sulfate solution, an aqueous cobalt sulfate solution and an aqueous manganese sulfate solution were mixed together such that the atomic ratio between nickel atoms, cobalt atoms and manganese atoms became 50:20:30, to thereby prepare a raw material mixture solution.

Then, the obtained raw material mixture solution and an aqueous ammonium sulfate solution as a complexing agent were continuously added to the reaction vessel with stirring. An aqueous sodium hydroxide solution was dropwise added thereto at an appropriate timing such that the pH of the solution in the reaction vessel became 12.1, thereby obtaining nickel cobalt manganese composite metal hydroxide particles. The nickel cobalt manganese composite metal hydroxide particles were washed, dehydrated, washed, dehydrated, separated and dried to obtain a hydroxide raw material powder 4 as a precursor 11.

2. Production and Evaluation of Lithium Composite Metal Oxide

The obtained precursor 11, lithium hydroxide weighed so that the amount (molar ratio) of Li with respect to the total amount 1 of Ni, Co, and Mn contained in the obtained precursor 11 was 1.26, and potassium sulfate weighed so that the amount (molar ratio) of potassium sulfate with respect to the total amount of lithium hydroxide and potassium sulfate as an inert melting agent was 0.10 were mixed in a mortar to obtain a mixture.

Then, the obtained mixture was heated at 940° C. for 5 hours in an $O_2$ atmosphere and then cooled to room temperature to obtain a calcination product.

The obtained calcination product was pulverized, dispersed in pure water at 5° C., and then dehydrated to obtain a powder. Further, the powder was washed with pure water adjusted to a liquid temperature of 5° C., dehydrated, heated at 80° C. for 15 hours, and then dried by continuously heating at 150° C. for 9 hours to obtain a powdery lithium composite metal oxide 11.

As a result of the composition analysis of the obtained lithium composite metal oxide 11, x=0.2, y=0.20, z=0.30, and w=0 in the composition formula (I).

3. Charge/Discharge Test of Non-Aqueous Electrolyte Secondary Battery

A coin-type battery was produced using the lithium composite metal oxide 11, and a charge/discharge test was performed. The cycle maintenance rate was 71.3%.

Comparative Example 4

1. Production of Precursor (Coprecipitate) of Lithium Composite Metal Oxide

The hydroxide raw material powder 1 obtained in the process of Example 1 was used as the precursor 12.

2. Production and Evaluation of Lithium Composite Metal Oxide

The obtained precursor 12, and lithium hydroxide weighed so that the amount (molar ratio) of Li with respect to the total amount 1 of Ni, Co, and Mn contained in the obtained precursor 12 was 1.08 were mixed in a mortar to obtain a mixture.

Then, the obtained mixture was heated at 820° C. for 6 hours in an $O_2$ atmosphere and then cooled to room temperature to obtain a calcination product. The obtained calcination product was pulverized to obtain a powdery lithium composite metal oxide 12.

As a result of the composition analysis of the obtained lithium composite metal oxide 12, x=0.04, y=0.08, z=0.04, and w=0 in the composition formula (I).

3. Charge/Discharge Test of Non-Aqueous Electrolyte Secondary Battery

A coin-type battery was produced using the lithium composite metal oxide 12, and a charge/discharge test was performed. The cycle maintenance rate was 75.2%.

Comparative Example 5

1. Production of Precursor (Coprecipitate) of Lithium Composite Metal Oxide

The hydroxide raw material powder 2 obtained in the process of Example 8 was used as the precursor 13.

2. Production and Evaluation of Lithium Composite Metal Oxide

The obtained precursor 13, and lithium hydroxide weighed so that the amount (molar ratio) of Li with respect to the total amount 1 of Ni, Co, and Mn contained in the obtained precursor 13 was 1.10 were mixed in a mortar to obtain a mixture.

Then, the obtained mixture was heated at 760° C. for 6 hours in an $O_2$ atmosphere and then cooled to room temperature to obtain a calcination product.

The obtained calcination product was pulverized, dispersed in pure water at 5° C., and then dehydrated, heated at 80° C. for 15 hours, and then dried by continuously heating at 150° C. for 9 hours to obtain a powdery lithium composite metal oxide 13.

As a result of the composition analysis of the obtained lithium composite metal oxide 13, x=−0.01, y=0.08, z=0.04, and w=0 in the composition formula (I).

3. Charge/Discharge Test of Non-Aqueous Electrolyte Secondary Battery

A coin-type battery was produced using the lithium composite metal oxide 13, and a charge/discharge test was performed. The cycle maintenance rate was 72.5%.

Table 1 shows the pulverization conditions of the precursors obtained in Examples 1 to 8 and Comparative Examples 1 to 5, the composition, the ratio (A/B) (Requirement (1)) of the half width A with respect to the half width B of the positive electrode active materials obtained in Examples 1 to 8 and Comparative Examples 1 to 5 determined by the powder X-ray diffraction measurement, the ratio ($D_{90}/D_{10}$) (Requirement (2)) of the volume-based 90% cumulative particle size ($D_{90}$) with respect to the volume-based 10% cumulative particle size ($D_{10}$), the half width A (Requirement (1)-1) determined by the powder X-ray diffraction measurement, the ratio ($I_2/I_1$) (Requirement (3)) of the integral intensity $I_2$ with respect to the integral intensity $I_1$ determined by the powder X-ray diffraction measurement, the volume-based 50% cumulative particle size ($D_{50}$), and the cycle maintenance rate obtained by the charge/discharge test using the positive electrode active materials obtained in Examples 1 to 8 and Comparative Examples 1 to 5.

TABLE 1

| | Precursor Pulverization Method | Melting Agent | x | y | z | w | Requirement (1) | Requirement (2) | Requirement (1)-1 | Requirement (3) | $D_{50}$ (µm) | Cycle Maintenance Rate (%) |
|---|---|---|---|---|---|---|---|---|---|---|---|---|
| Example.1 | Jet Mill Pulverization (0.6 MPa) | $K_2SO_4$ | 0.04 | 0.08 | 0.04 | 0 | 1.46 | 89.9 | 0.309 | 4.7 | 3.0 | 82.6 |

TABLE 1-continued

| | Precursor Pulverization Method | Melting Agent | x | y | z | w | Requirement (1) | Requirement (2) | Requirement (1)-1 | Requirement (3) | $D_{50}$ (μm) | Cycle Maintenance Rate (%) |
|---|---|---|---|---|---|---|---|---|---|---|---|---|
| Example.2 | Jet Mill Pulverization (0.4 MPa) | $K_2SO_4$ | 0.04 | 0.08 | 0.04 | 0 | 1.43 | 4.5 | 0.290 | 4.4 | 6.7 | 82.9 |
| Example.3 | Counter Jet Mill Pulverization | $K_2SO_4$ | 0.05 | 0.08 | 0.04 | 0 | 1.63 | 15.9 | 0.335 | 4.4 | 3.3 | 81.3 |
| Example.4 | Counter Jet Mill Pulverization | $K_2SO_4$ | 0.03 | 0.08 | 0.04 | 0 | 1.47 | 20.2 | 0.290 | 5.5 | 4.7 | 86.7 |
| Example.5 | Counter Jet Mill Pulverization | $K_2SO_4$ | 0.02 | 0.08 | 0.04 | 0 | 1.58 | 16.4 | 0.304 | 4.0 | 4.2 | 87.9 |
| Example.6 | Counter Jet Mill Pulverization | $K_2SO_4$ | 0.02 | 0.08 | 0.04 | 0 | 1.57 | 22.3 | 0.314 | 4.6 | 3.8 | 87.9 |
| Example.7 | Counter Jet Mill Pulverization | $K_2SO_4$ | 0.03 | 0.07 | 0.02 | 0 | 1.65 | 11.2 | 0.312 | 4.7 | 4.1 | 84.5 |
| Example.8 | Jet Mill Pulverization (0.4 MPa) | $K_2SO_4$ | 0.2 | 0.20 | 0.30 | 0 | 1.39 | 3.7 | 0.260 | 4.7 | 8.0 | 86.3 |
| Comparative Example.1 | Jet Mill Pulverization (0.8 MPa) | $K_2SO_4$ | 0.05 | 0.08 | 0.04 | 0 | 1.37 | 11.7 | 0.283 | 5.1 | 4.0 | 78.2 |
| Comparative Example.2 | Not Pulverized | $K_2SO_4$ | 0.05 | 0.08 | 0.04 | 0 | 1.38 | 2.8 | 0.296 | 3.9 | 16.6 | 72.9 |
| Comparative Example.3 | Not Pulverized | $K_2SO_4$ | 0.2 | 0.20 | 0.30 | 0 | 1.24 | 7.0 | 0.203 | 6.9 | 9.8 | 71.3 |
| Comparative Example.4 | Not Pulverized | Not used | 0.04 | 0.08 | 0.04 | 0 | 1.76 | 2.7 | 0.321 | 3.2 | 18.6 | 75.2 |
| Comparative Example.5 | Not Pulverized | Not used | −0.01 | 0.08 | 0.04 | 0 | 1.76 | 5.0 | 0.341 | 3.4 | 7.7 | 72.5 |

As shown in Table 1, Examples 1 to 7, which were lithium composite metal oxides to which the present invention was applied, had a better cycle maintenance rate than Comparative Examples 1, 2, 4, and 5. Similarly, Example 8 had a better cycle maintenance rate than Comparative Example 3.

INDUSTRIAL APPLICABILITY

The lithium composite metal oxide of the present invention is useful because the lithium composite metal oxide has high cycle performance when used as a positive electrode active material for a lithium secondary battery.

REFERENCE SIGNS LIST

1: Separator
2: Positive electrode
3: Negative electrode
4: Electrode group
5: Battery can
6: Electrolytic liquid
7: Top insulator
8: Sealing body
10: Lithium secondary battery
21: Positive electrode lead
31: Negative electrode lead

What is claimed is:

1. A lithium composite metal oxide which satisfies requirements (1) and (2):
(1) a ratio (AB) of a half width A of a diffraction peak in a range of 2θ=64.5±1° with respect to a half width B of a diffraction peak in a range of 2θ=44.4±1° in a powder X-ray diffraction measurement for the lithium composite metal oxide using Cu—Kα ray is 1.43 or more and 1.75 or less;
(2) a ratio ($D_{90}/D_{10}$) of a volume-based 90% cumulative particle size ($D_{90}$) determined from a particle size distribution measurement with respect to a volume-based 10% cumulative particle size ($D_{10}$) determined from the particle size distribution measurement is 3 or more.

2. The lithium composite metal oxide according to claim 1, which satisfies requirement (1)-1: the half width A is 0.200° or more and 0.350° or less.

3. The lithium composite metal oxide according to claim 2, which satisfies requirement (3): a ratio $I_2/I_1$ of an integral intensity $I_2$ of a diffraction peak in a range of 2θ=18.5±1° with respect to an integral intensity $I_1$ of a diffraction peak in a range of 2θ=64.5±1° in a powder X-ray diffraction measurement for the lithium composite metal oxide using Cu—Kα ray is 4.0 or more and 6.0 or less.

4. The lithium composite metal oxide according to claim 1, which satisfies requirement (3): a ratio $I_2/I_1$ of an integral intensity $I_2$ of a diffraction peak in a range of 2θ=18.5±1° with respect to an integral intensity $I_1$ of a diffraction peak in a range of 2θ=64.5±1° in a powder X-ray diffraction measurement for the lithium composite metal oxide using Cu—Kα ray is 4.0 or more and 6.0 or less.

5. The lithium composite metal oxide according to claim 1, which satisfies composition formula (I):

$$Li[Li_x(Ni_{(1-y-z-w)}Co_yMn_zM_w)_{1-x}]O_2 \quad (I),$$

wherein relations −0.1≤x≤0.2, 0≤y≤0.4, 0≤z≤0.4, 0≤w≤0.1, and y+z+w<1 are satisfied, and M is one or more elements selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.

6. The lithium composite metal oxide according to claim 5, wherein x in the composition formula (I) is 0<x≤0.2.

7. The lithium composite metal oxide according to claim 6, wherein y+z+w in the composition formula (I) is 0<y+z+w≤0.3.

8. The lithium composite metal oxide according to claim 5, wherein y+z+w in the composition formula (I) is 0<y+z+w≤0.3.

9. The lithium composite metal oxide according to claim 1, wherein a volume-based 50% cumulative particle size ($D_{50}$) determined from the particle size distribution measurement is 500 nm or more and 9 mm or less.

10. A positive electrode active material for a lithium secondary battery, comprising the lithium composite metal oxide according to claim 1.

11. A positive electrode for a lithium secondary battery, comprising the positive electrode active material for a lithium secondary battery according to claim 10.

12. A lithium secondary battery, comprising the positive electrode for a lithium secondary battery according to claim 11.

* * * * *